(12) United States Patent
Colmegna

(10) Patent No.: US 11,104,576 B2
(45) Date of Patent: Aug. 31, 2021

(54) PROCESS FOR ARGON AND NITROGEN PRODUCTION

(71) Applicant: CASALE SA, Lugano (CH)

(72) Inventor: Giacomo Colmegna, Baden (CH)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/623,049

(22) PCT Filed: Jun. 18, 2018

(86) PCT No.: PCT/EP2018/066093
§ 371 (c)(1),
(2) Date: Dec. 16, 2019

(87) PCT Pub. No.: WO2019/002000
PCT Pub. Date: Jan. 3, 2019

(65) Prior Publication Data
US 2020/0165131 A1 May 28, 2020

(30) Foreign Application Priority Data
Jun. 27, 2017 (EP) .................... 17177996

(51) Int. Cl.
*B01D 53/02* (2006.01)
*C01B 21/04* (2006.01)
*C01B 23/00* (2006.01)
*F25J 3/06* (2006.01)

(52) U.S. Cl.
CPC .......... *C01B 23/0094* (2013.01); *B01D 53/02* (2013.01); *C01B 21/0422* (2013.01); *C01B 21/0433* (2013.01); *C01B 21/0494* (2013.01); *C01B 23/0026* (2013.01); *C01B 23/0036* (2013.01); *F25J 3/06* (2013.01); *B01D 2253/116* (2013.01); *B01D 2256/10* (2013.01); *B01D 2256/18* (2013.01); *B01D 2257/404* (2013.01); *B01D 2257/504* (2013.01); *C01B 2210/0006* (2013.01); *C01B 2210/0009* (2013.01); *C01B 2210/0034* (2013.01); *C01B 2210/0051* (2013.01); *C01B 2210/0075* (2013.01); *C01P 2006/80* (2013.01)

(58) Field of Classification Search
CPC ................ C01B 21/26; C01B 23/0089; C01B 2210/0075; C01B 23/0094; C01B 2210/0051; C01B 21/0433; C01B 21/0422; C01B 23/0036; C01B 2210/0006; C01B 2210/0009; C01B 21/0494; C01B 23/0026; C01B 2210/0046; C01B 21/38; C01B 21/40; B01D 53/02; B01D 2256/18; B01D 2253/116; B01D 2257/504; B01D 2256/10; B01D 2257/404; C01P 2006/80; F25J 3/0219; F25J 3/0257; F25J 3/0285; F25J 3/06

See application file for complete search history.

(56) References Cited

U.S. PATENT DOCUMENTS

| | | | |
|---|---|---|---|
| 3,762,133 A | 10/1973 | Merriman et al. | |
| 4,153,429 A * | 5/1979 | Matthews | B01D 53/02 95/117 |
| 10,464,813 B2 * | 11/2019 | Xiu | C01B 21/22 |
| 2006/0165573 A1 * | 7/2006 | Ohmi | B01D 53/04 423/210 |
| 2008/0196584 A1 | 8/2008 | Ha | |
| 2014/0366576 A1 * | 12/2014 | Xiu | C01B 21/22 62/617 |
| 2015/0098881 A1 | 4/2015 | Perbandt | |
| 2019/0284052 A1 | 9/2019 | Ostuni et al. | |

FOREIGN PATENT DOCUMENTS

| | | |
|---|---|---|
| DE | 652958 C | 11/1937 |
| RU | 2528786 C1 | 9/2014 |
| RU | 2580919 C2 | 4/2016 |
| WO | 2005082779 A2 | 9/2005 |
| WO | 2010036748 A1 | 4/2010 |

OTHER PUBLICATIONS

International Preliminary Report on Patentability from International Application No. PCT/EP2018/066093 completed Sep. 10, 2019.
International Search Report from International Application No. PCT/EP2018/066093 dated Aug. 6, 2018.
Moons, Christiaan , "Advanced Process Control for Syngas Units", Nov. 2008, 30-35.

* cited by examiner

*Primary Examiner* — Timothy C Vanoy
(74) *Attorney, Agent, or Firm* — Dorsey & Whitney LLP

(57) ABSTRACT

A process comprising: subjecting a process gas containing NOx to a stage for absorption of NOx in a suitable absorption means, obtaining nitric acid and a tail gas containing nitrogen, argon and residual NOx; subjecting said tail gas to a treatment which comprises at least one NOx removal stage, obtaining a conditioned tail gas; subjecting at least a portion of said conditioned tail gas to a separation treatment, obtaining a product stream containing argon and a product stream containing nitrogen.

28 Claims, 2 Drawing Sheets

PROCESS FOR ARGON AND NITROGEN PRODUCTION

FIELD OF APPLICATION

The invention relates to the technical field of argon and nitrogen production.

PRIOR ART

Argon (Ar) is a noble gas and as such is chemically inert. Thanks to this property, it finds numerous industrial applications, for example in the formation of inert atmospheres.

Thanks to its low reactivity, molecular nitrogen ($N_2$) is also particularly suitable for the creation of inert atmospheres in different industrial and technological environments. Large quantities of nitrogen are also used for cryogenic applications, but the main use remains the synthesis of ammonia, from which fertilizers, polymers, explosives and colorants are obtained.

Argon and nitrogen are commonly obtained from an air fractionation process, together with oxygen.

Most air fractionation plants operate a fractional distillation process of liquid air. Said process is known as cryogenic process and substantially separates argon, nitrogen and oxygen, making use of their different boiling points, which are respectively −186° C., −196° C. and −183° C. Air liquefaction processes known in the art are, for example, the Linde process and the Claude process. Fractional distillation is generally performed in a system comprising several distillation columns, typically three columns.

One problem of this technology is that argon and oxygen have boiling points which are very close to each other, and this makes it difficult to obtain high purity argon, separating it from the oxygen. Nitrogen obtained with this technology also generally contains ppm levels of Ar and oxygen, which are undesirable.

In order to promote the separation of argon and nitrogen as much as possible, large-size distillation columns with a large number of plates may be used, the number of columns may be increased, or adsorption beds may be installed downstream of the columns thus performing a further purification of argon and nitrogen streams obtained from distillation. However, all these solutions are costly in terms of plant design and energy consumption.

Other plants which produce argon and nitrogen use a selective adsorption process through membranes. However, these plants are still not very widespread and are rather costly.

SUMMARY OF THE INVENTION

The object of the present invention is to provide a process which allows to obtain substantially pure argon and nitrogen and which is at the same time both simple and low-cost.

The applicant has found that the tail gas of a process for the synthesis of nitric acid, in view of its composition, is a convenient source for producing argon and nitrogen.

As is known, the synthesis of nitric acid according to the Ostwald process comprises an absorption step of nitrogen oxides NOx in water, which produces a stream of nitric acid and a tail gas containing nitrogen, argon, residual NOx and optionally also $N_2O$. In the prior art, said tail gas is generally treated to remove NOx and possibly $N_2O$ according to the prescribed limits for emissions into atmosphere, and then discharged. The idea underlying the invention is that of treating at least part of said tail gas in order to separate the argon and nitrogen contained therein, thus obtaining products with a high commercial value.

The aforementioned objects are achieved with a process according to claim 1, which comprises the following steps: subjecting a process gas containing NOx to a NOx absorption stage in a suitable absorption means, obtaining nitric acid and a tail gas containing nitrogen, argon and residual NOx;

subjecting said tail gas to a treatment comprising at least one NOx removal stage, obtaining a conditioned tail gas;

subjecting at least a portion of said conditioned tail gas to a separation treatment, obtaining a first product stream containing argon and a second product stream containing nitrogen.

The absorption means used during said NOx absorption stage is preferably water.

Preferably, said conditioned tail gas is split into at least two portions, a first portion being subjected to the aforementioned separation treatment and a second portion being advantageously treated in a suitable expander.

The first product stream has an argon concentration which is greater than the argon concentration in said conditioned tail gas, as a result of the separation treatment. Similarly, the second product stream has a nitrogen concentration which is greater than the nitrogen concentration in said conditioned tail gas.

Preferably, said first product stream contains at least 99.5% (vol) of argon, more preferably at least 99.95% (vol), and even more preferably at least 99.995% (vol).

Preferably, said second product stream contains at least 99.5% (vol) of nitrogen, more preferably at least 99.95% (vol), and even more preferably at least 99.995% (vol).

The separation treatment is suitable to selectively separate at least argon from nitrogen. Preferably, said separation treatment is a cryogenic treatment at a temperature of no more than 133 K (−140° C.).

In a preferred embodiment, said process gas is obtained by oxidation of a stream of ammonia in the presence of air or enriched air. Consequently, the source of nitrogen and argon contained in the tail gas is substantially the air or enriched air introduced during said oxidation step.

Said oxidation step essentially comprises a first stage of catalytic oxidation of ammonia providing nitrogen monoxide NO and—in a smaller amount—dinitrogen monoxide $N_2O$, and a second stage of oxidation of NO providing nitrogen dioxide $NO_2$ or dinitrogen tetroxide $N_2O_4$.

According to a widespread practice in the field, the compounds NO, $NO_2$ and $N_2O_4$ are indicated with the general formula of NOx.

The stage of absorption of the process gas is advantageously performed in an absorption tower, wherein the NOx contained in said process gas are at least partly absorbed in said absorption means, preferably water, to provide nitric acid and the aforementioned tail gas.

Optionally, the process gas may be subjected to $N_2O$ removal prior to the absorption stage (so-called "secondary $N_2O$ removal"). In some embodiments, $N_2O$ is removed from the tail gas (so-called "tertiary removal"); some embodiments envisage a secondary removal and a further tertiary removal.

The conditioned tail gas mainly contains nitrogen. Preferably said gas contains nitrogen in an amount equal to or greater than 80% (vol), preferably greater than 90% (vol), and even more preferably between 95 and 98% (vol).

The conditioned tail gas also contains a non-negligible amount of argon, typically at least 0.9% (vol), preferably at least 1.0% (vol), and even more preferably at least 1.1% (vol).

Said conditioned tail gas may also contain small quantities of water, in an amount preferably not greater than 0.5% (vol), more preferably between 0.2 and 0.3% (vol).

Said conditioned tail gas preferably contains negligible amounts of NOx and N2O.

Preferably, said conditioned tail gas contains an amount of NOx not greater than 200 ppm, more preferably not greater than 30 ppm, even more preferably not greater than 5 ppm.

Preferably, said conditioned tail gas contains an amount of $N_2O$ not greater than 1000 ppm, preferably not greater than 100 ppm; more preferably not greater than 30 ppm, even more preferably not greater than 10 ppm.

Given the tendency of NOx and $N_2O$ to freeze during the separation treatment, the presence of amounts of NOx and $N_2O$ greater than those identified above would entail a series of operational problems during operation of the relative plant and safety problems during stoppage of the plant, due to the release into atmosphere of accumulated amounts of NOx and $N_2O$.

In some embodiments, the conditioned tail gas has a certain oxygen content, preferably not greater than 5% (vol), more preferably ranging from 2% to 3% (vol).

The treatment of the tail gas preferably comprises a DeNOx stage by means of catalytic reduction, more preferably selective catalytic reduction (SCR) in the presence of a reducing agent, preferably ammonia.

In other embodiments of the invention, the treatment of the tail gas comprises a DeNOx stage of non-selective catalytic reduction (NSCR). In this case, the conditioned tail gas is substantially devoid of oxygen and may contain traces of hydrocarbons or hydrogen, CO, $CO_2$ and ammonia.

Preferably, the conditioned tail gas has a pressure greater than 4 bar, preferably ranging from 4 to 15 bar. Said pressure corresponds to the preferred pressure for the treatment of the tail gas.

The conditioned tail gas contains no or very little carbon dioxide. For example the conditioned tail gas contains no more than 800 ppm of $CO_2$, preferably no more than 700 ppm and more preferably no more than 600 ppm. The symbol ppm denotes parts per million in volume.

Said separation treatment preferably comprises a fractional distillation making use of the different boiling points, which are −186° C. for argon, −196° C. for nitrogen and −183° C. for oxygen (at standard conditions STP).

Preferably, said separation treatment comprises: cooling and subsequently expanding the conditioned tail gas, obtaining a partial liquefaction, and subjecting the liquefied fraction to fractional distillation. Therefore the process preferably includes the fractional distillation of at least one of argon, nitrogen and oxygen at the respective boiling point.

The process may comprise a step of removing $CO_2$ before the cryogenic treatment to avoid freezing and accumulation of $CO_2$ in the cold box. Said removal of $CO_2$ preferably includes passing the gas through a molecular sieve.

Another aspect of the invention is a process for the production of a stream containing argon and a stream containing nitrogen by means of separation treatment of a conditioned tail gas of a plant for the synthesis of nitric acid, said conditioned tail gas being obtained through the following steps:

subjecting a process gas containing NOx to a NOx absorption stage in a suitable absorption means, obtaining nitric acid and a tail gas containing nitrogen, argon and residual NOx;

subjecting said tail gas to a treatment comprising at least one NOx removal stage, obtaining said conditioned tail gas.

A further aspect of the invention relates to a plant for argon and nitrogen production according to the claims.

The conditioned tail gas has a greater content of argon and a much smaller content of oxygen compared to air. For these reasons, obtaining argon from said conditioned tail gas is substantially easier and more profitable than separation from air. In particular, the smaller oxygen content (or the oxygen absence in the case of NSCR) facilitates the production of a product stream containing argon, because the oxygen, owing to the close boiling point, is the most difficult component to separate from the argon.

Another advantage of said tail gas is provided by its small content of pollutants (in particular NOx and $N_2O$), which allows to obtain streams of argon and nitrogen with high purity and allows a correct operation of the plant, avoiding problems associated with the management of $N_2O$ and toxic gases such as NOx.

A further advantage is the availability of the conditioned tail gas at high pressure (typically greater than 4 bar, for example 4-15 bar) which allows partial liquefaction of the gas by means of expansion. In this way the use of a dedicated compressor for said tail gas is no longer necessary, which represents an advantage from an economic point of view compared to a conventional air fractionation plant, since the compressor constitutes the most costly component thereof.

Given the absence of the compressor due to the fact that the tail gas is under pressure and given the simplified configuration of the fractionation columns due to the reduced oxygen content in the tail gas, the capital cost of the fractionation plant according to the invention is much less than that of a conventional air fractionation plant. Consequently, argon and nitrogen may be obtained at competitive prices.

This is also true considering that the nitric acid plant must purchase from the market the electricity needed to compensate for the power production which is lost due to the fact that the tail gas is not fully expanded in the expander, but is subjected to fractionation.

For these reasons, the conditioned tail gas represents a particularly advantageous source for the production of argon and nitrogen.

Moreover, the invention adds value to the tail gas emitted by a plant for the nitric acid production, which in the prior art is instead discharged into atmosphere. In this way the invention adds a significant source of income to the nitric acid plants. Therefore, one aspect of the invention is represented by a combined production of nitric acid, argon and nitrogen. The nitrogen thus obtained may, for example, be sold on the market or used to increase the production capacity of a possible ammonia plant combined with the nitric acid plant.

A further advantage of the invention is the saving of natural resources and of energy compared to the prior art methods of argon and nitrogen production which use air as raw material (i.e. distillation or selective adsorption), these methods requiring a significant amount of energy.

The invention is especially attractive in the case where the local argon and nitrogen market (where the nitric acid plant is present) is not balanced with respect to the composition of the air.

The advantages of the invention will become even more clear with reference to the detailed description below, which relates to a preferred embodiment of the invention.

DETAILED DESCRIPTION OF A PREFERRED EMBODIMENT

Figure 1:
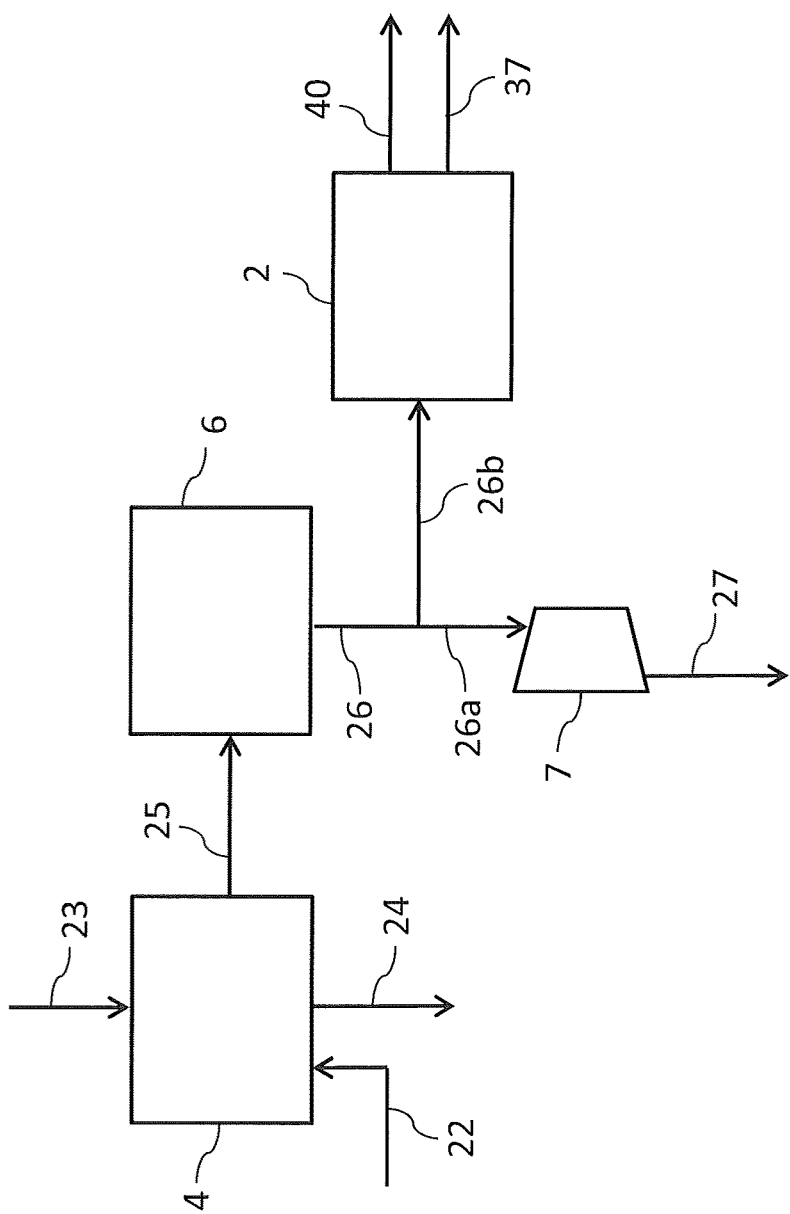
FIG. 1 shows a simplified diagram of the plant according to the invention.

The plant according to FIG. 1 comprises essentially an absorption tower 4, a treatment unit 6 for the tail gas leaving said tower, an expander 7 and a section 2 for the separation of a stream of argon and a stream of nitrogen.

Said plant operates as follows.

A process gas 22 containing NOx and, in a smaller amount, $N_2O$ and a stream of water 23 are fed to an absorption tower 4. Inside said tower 4, the NOx are partly absorbed in water to give a stream 24 containing nitric acid and a tail gas 25 mainly containing nitrogen and smaller amounts of oxygen, argon, water, $N_2O$ and residual NOx.

Said tail gas 25 is sent to the treatment unit 6, where the NOx and optionally also the $N_2O$ are at least partly removed, providing a conditioned tail gas 26. The gas 26 leaving said treatment unit 6 has preferably a pressure ranging from 4 to 15 bar.

Said conditioned gas 26 is advantageously split into two portions: a first portion 26a is expanded inside the expander 7 and discharged into atmosphere as stream 27, and a second portion 26b is fed to the section 2 and subjected to a separation treatment, obtaining a stream 40 containing argon and a stream 37 containing nitrogen.

Figure 2:
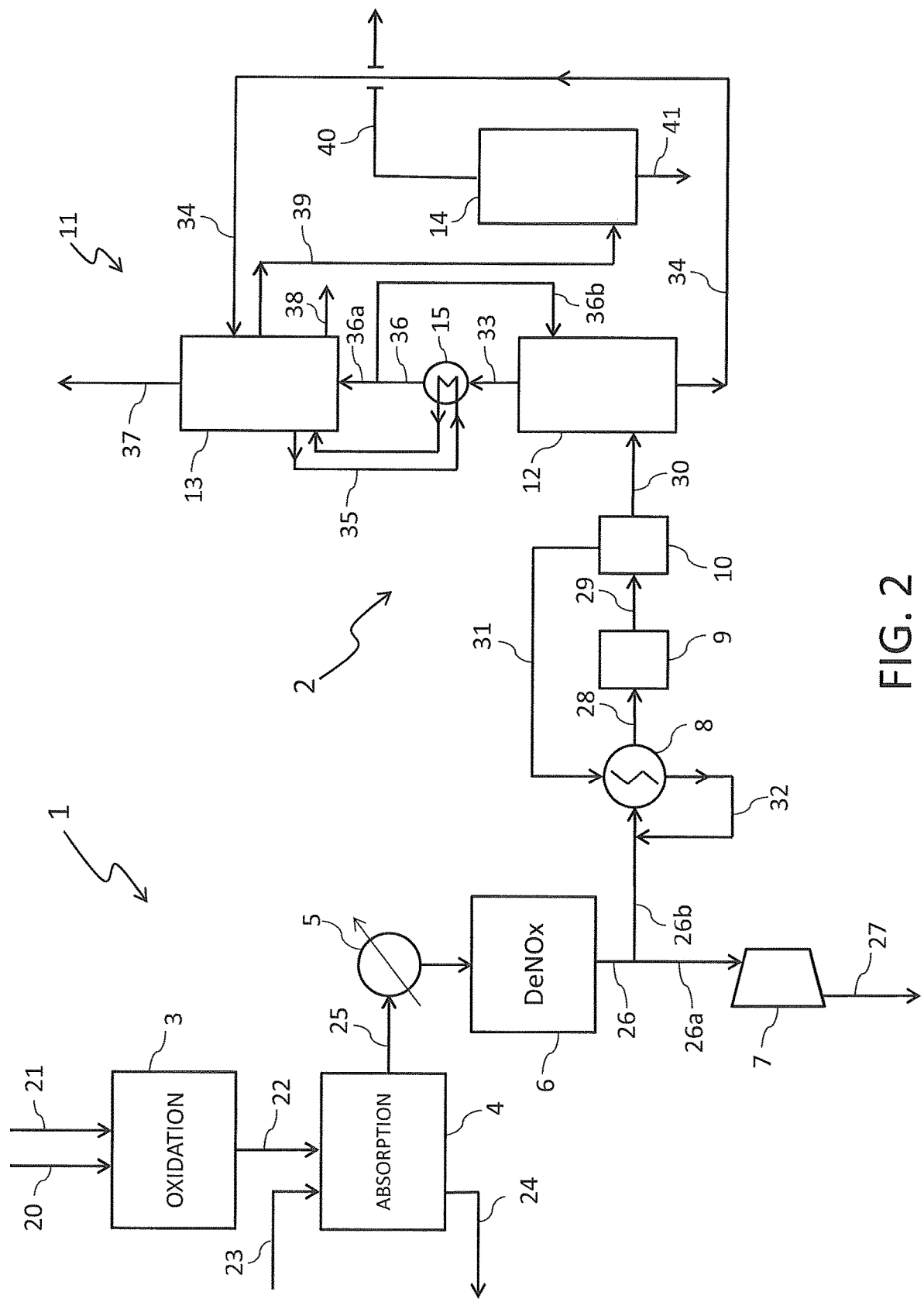
FIG. 2 shows a diagram of a plant for the combined production of nitric acid, argon and nitrogen according to a preferred embodiment of the invention.

FIG. 2 shows in greater detail the plant of FIG. 1. It comprises in particular a section 1 for the synthesis of nitric acid and a section 2 for argon and nitrogen production.

The section 1 essentially comprises a reactor 3 for catalytic oxidation of ammonia, an absorption tower 4, a heat exchanger 5, a unit 6 for NOx removal and optionally $N_2O$ removal, and an expander 7. Especially in the case of high-capacity plants, said section 1 also comprises a compressor between the reactor 3 and the absorption tower 4.

Said section 1 operates as follows.

A stream of ammonia 20 and an air flow 21 are fed the reactor 3. Inside the reactor 3 the ammonia is catalytically oxidized to give nitrogen monoxide NO and—in a smaller amount—dinitrogen monoxide $N_2O$, and at least a portion of NO is further oxidized to give nitrogen dioxide $NO_2$ or dinitrogen tetroxide $N_2O_4$, producing a gaseous stream 22.

Said gaseous stream 22 and a stream of water 23 are introduced into the absorption tower 4, where the NOx are at least partly absorbed to give nitric acid 24.

The absorption tower 4 also provides a tail gas 25 as head product, mainly containing nitrogen and smaller quantities of oxygen, water, argon, $N_2O$ and residual NOx.

Said tail gas 25 is pre-heated in the exchanger 5 and subsequently fed to the unit 6. According to the example shown in FIG. 2, said unit 6 comprises a DeNOx section inside which the NOx are at least partially removed by means of selective catalytic reduction (SCR).

The unit 6 operates at a pressure ranging from 4 to 15 bar and provides a gas 26 mainly containing nitrogen, 2-3% oxygen, 0.2-0.3% water, NOx<30 ppm and $N_2O$<30 ppm.

Said gas 26 is split into two portions: a first portion 26a is expanded inside the expander 7 and a second portion 26b is exported from the section 1 for the synthesis of nitric acid and is fed to the section 2 for argon and nitrogen production.

The expander 7 produces at least part of the power required by the compressors (not shown) of the nitric acid section 1. The expanded gas 27 is discharged into atmosphere.

The section 2 for argon and nitrogen production essentially comprises a heat exchanger 8, an expander 9, a separator 10 and a distillation apparatus 11.

According to the example of FIG. 2, said apparatus 11 comprises: a first distillation column 12 which operates at a pressure of about 4-5 bar, a second distillation column 13 which operates at atmospheric pressure and a third distillation column 14 which separates argon.

Said section 2 operates as follows.

The portion 26b of the gas coming from the section 1 is mixed with a recycling stream 32 and is fed to the heat exchanger 8 where it is cooled releasing heat to the stream 31 coming from the separator 10 and obtaining a refrigerated gas 28.

The refrigerated gas 28 is then sent to the expander 9, where it is partly liquefied. The expander 9 is represented by a valve or by a turbine depending on the embodiments.

The partially liquefied gas 29 is fed to the separator 10. The separator 10 separates a liquid phase 30 and a gaseous phase 31. The liquid phase 30 is sent to the distillation apparatus 11, while the gaseous phase 31 is sent to the heat exchanger 8 in order to refrigerate the incoming gas 26b and is then reintroduced into the cycle as stream 32.

In greater detail, the liquid phase 30 feeds the first column 12, which separates gaseous nitrogen 33 from the top and a liquid fraction 34 containing nitrogen, oxygen and argon from the bottom.

The liquid fraction 34 is sent to the second column 13, while the nitrogen 33 feeds a condenser 15, wherein it condenses exchanging heat with a tail fraction 35 of the column 13.

According to the example of FIG. 1, the stream of condensed nitrogen 36 leaving the condenser 15 is split into two portions: a first portion 36a is sent to the second column 13 and a second portion 36b is sent to the first column 12 as reflux stream.

Said second column 13 separates nitrogen 37 and oxygen 38.

A fraction 39 containing argon and oxygen is collected in an intermediate point of the second column 13 and is sent to the third column 14 which separates substantially pure argon 40 and oxygen 41.

Example

In a plant which produces 500 MTD (metric tons per day) of nitric acid, a process gas containing 5-6% of NOx is obtained at the inlet of the absorption tower. At the outlet of the aforementioned tower the tail gas contains about 300-500 ppm of NOx and at the outlet of the treatment section (SCR) said gas contains about 0-22 ppm. Subjecting this gas to a separation section, about 77,000 kg/h of nitrogen and about 1'300 kg/h of argon are obtained.

The invention claimed is:

1. A process, comprising:
   subjecting a process gas containing $NO_x$ to a $NO_x$ absorption stage in an absorption means, thereby obtaining nitric acid and a tail gas containing nitrogen, argon and residual $NO_x$;

subjecting said tail gas to a treatment comprising at least one $NO_x$ removal stage, thereby obtaining a conditioned tail gas; and subjecting at least a portion of said conditioned tail gas to a separation treatment, thereby obtaining a first product stream containing argon and a second product stream containing nitrogen.

2. The process of claim 1, wherein said first product stream has an argon content of at least 99.5% (vol).

3. The process of claim 2, wherein said argon content is at least 99.95% (vol).

4. The process of claim 2, wherein said argon content is at least 99.995% (vol).

5. The process of claim 1, wherein said second product stream has a nitrogen content of at least 99.5% (vol).

6. The process of claim 5, wherein said nitrogen content is at least 99.95% (vol).

7. The process of claim 5, wherein said nitrogen content is at least 99.995% (vol).

8. The process of claim 1, wherein said conditioned tail gas contains an amount of argon of at least 0.9% (vol).

9. The process of claim 1, wherein said conditioned tail gas contains an amount of NOx not greater than 200 ppm.

10. The process of claim 9, wherein the amount of $NO_x$ is not greater than 30 ppm.

11. The process of claim 9, wherein the amount of $NO_x$ is not greater than 5 ppm.

12. The process of claim 1, wherein said conditioned tail gas contains an amount of $N_2O$ not greater than 1000 ppm.

13. The process of claim 12, wherein said amount of $N_2O$ is not greater than 100 ppm.

14. The process of claim 12, wherein said amount of $N_2O$ is not greater than 30 ppm.

15. The process of claim 12, wherein said amount of $N_2O$ is not greater than 10 ppm.

16. The process of claim 1, wherein said conditioned tail gas contains an amount of oxygen not greater than 5% (vol).

17. The process of claim 16, wherein said amount of oxygen is from 2 to 3% (vol).

18. The process of claim 1, wherein said conditioned tail gas has a pressure greater than 4 bar.

19. The process of claim 18, wherein said pressure is from 4 bar to 15 bar.

20. The process of claim 1, wherein the process gas containing $NO_x$ is obtained by oxidation of a stream of ammonia in the presence of air or enriched air.

21. The process of claim 1, wherein the conditioned tail gas contains no more than 800 ppm of $CO_2$.

22. The process of claim 1, wherein the separation treatment includes a cryogenic treatment.

23. The process of 38, wherein said separation treatment comprises: cooling and subsequently expanding the conditioned tail gas, thereby obtaining a partial liquefaction, and subjecting the liquefied fraction to fractional distillation.

24. The process of claim 22, further comprising removing $CO_2$ before the cryogenic treatment.

25. The process of claim 24, wherein removing $CO_2$ before the cryogenic treatment is effected with a molecular sieve.

26. A plant, comprising:
an absorption tower, fed with a process gas containing NO and configured to absorb NOx in an absorption means, for providing nitric acid and a tail gas containing nitrogen, argon and residual Nox;
a treatment unit for said tail gas, configured to remove NO and give a conditioned tail gas; and
a separation section, configured to separate a first product stream containing argon and a second product stream containing nitrogen, said separation section being fed with at least a portion of said conditioned tail gas.

27. The plant of claim 26, wherein the separation section comprises:
a heat exchanger configured to refrigerate said at least one portion of the conditioned tail gas, obtaining a refrigerated gas;
an expander for said refrigerated gas, obtaining a partially liquefied gas;
a separator, wherein the liquefied fraction of said partially liquefied gas is separated from the non-liquefied fraction; and
a distillation apparatus, which receives said liquefied fraction and which separates said stream containing argon and said stream containing nitrogen.

28. The plant of claim 26, further comprising a reactor for oxidation of a stream of ammonia in the presence of air or enriched air, obtaining said process gas containing $NO_x$.

* * * * *